United States Patent Office 3,442,745
Patented May 6, 1969

3,442,745
ADHESIVE BONDING
Ival O. Salyer, Dayton, and David Gerald Glasgow, Centerville, Ohio, assignors, by mesne assignments, to the United States of America as represented by the United States Atomic Energy Commission
No Drawing. Filed July 30, 1965, Ser. No. 476,171
Int. Cl. C09j 3/00
U.S. Cl. 156—332   10 Claims

ABSTRACT OF THE DISCLOSURE

Method of adhesively bonding with an ethylene/acrylic acid copolymer having 50–95% by weight ethylene; likewise with powdered metal and metal oxide fillers.

---

The invention described herein was made in the course of, or under, a contract with the United States Atomic Energy Commission.

This invention relates broadly to adhesive bonding, and more particularly provides a new and valuable method of bonding surfaces by means of certain organic polymers.

Numerous organic polymers have been used as adhesives, e.g., in joining together structural components, in the manufacture of laminates, and in the fabrication of composites of all kinds. The major disadvantage of a great number of polymeric adhesives is their sensitivity to moisture. For example, polymers containing an ester linkage are readily hydrolyzed; hence, when such polymers are employed as adhesives the original bond strength deteriorates upon storage in a humid atmosphere, particularly when the temperature is substantially above, say, 100° F. When these polymers are used as adhesives for the readily oxidizable metals, not only does bond strength deteriorate owing to weakening of the polymer by hydrolysis, but the reactive metal rapidly forms a non-adherent oxide at the metal surface. There thus results failure of an adhesive bond at the oxide-metal interface. In prior art, use of such moisture-sensitive adhesives thus limited the field of application and storage means to areas where high temperature and humidity were not encountered. Although a degree of protection against moisture could be achieved by coating the exposed edge of the bonding layer with a moisture-impermeable film, this expedient entailed not only the use of a coating that would adhere to both the substrate and the bonding layer, but it also required extra-ordinary precaution in handling of the bonded structure in order to avoid rupture of the protective film.

Adhesives which are moisture-resistant generally have a chemical structure which does not permit tough, tenacious adhesion. Even when the polymer possesses proper resistivity to moisture and is known to form long-lasting touch, tenacious bonds with some materials, it may be quite inefficient for others, e.g., in bonding to smooth continuous surfaces, such as glass, plastic sheeting or metal, where strong interaction at the smooth surface rather than merely mechanical bonding is required.

Also, moisture-resistant polymeric adhesives generally involve the use of very high temperatures and pressures for bonding. The substrate which may be employed with such adhesives is accordingly limited. When the bonding is designed to form one unit from two or more previously formed components, as for example, production of hollow spheres from two hemispheric thin shells of metal or plastic, use of extreme conditions in bonding the components must be avoided for fear of distortion. Joining together preformed components to form a unit of complex geometry generally requires that bonding be effected without subjecting the components to form-distorting stresses.

Accordingly, an object of this invention is to provide bonded structures having improved resistivity to moisture.

Another object is to provide an improved method for adhesively bonding to a smooth, dense, non-porous surface.

Still another object is to provide a method for adhesively bonding to a metal surface to give a tenaciously bonded structure comprising a moisture-resistant, bubble-free bonding layer.

These and other objects hereinafter defined are met by the following invention wherein there is employed as the bonding agent an ethylene/acrylic acid copolymer consisting essentially of from 50 to 95 weight percent ethylene with the balance being acrylic acid. The method comprises pressing the said copolymer in the molten state between bodies having a melting point above the melting point of the copolymer, to contact the molten copolymer with those surface areas of said bodies which are to be bonded, and then maintaining said contact while allowing the copolymer to harden by cooling to ambient temperature.

In a preferred embodiment of the invention, a layer of said copolymer is interposed between bodies having a melting point above the melting point of the copolymer, the resulting assembly is heated under a pressure of from 20 to 500 p.s.i. at a temperature of above the melting point of the copolymer to contact the molten copolymer with those surface areas of said bodies which are to be bonded, and contact of the copolymer with said areas is maintained while allowing the copolymer to harden by cooling to ambient temperature. Although only sufficient heat to melt the copolymer is needed, heating may be conducted to below the decomposition point of the materials involved, e.g., to 200° C.

Ethylene/acrylic acid copolymers are well known in the art. They may be prepared by polymerizing a mixture of ethylene and acrylic acid in the appropriate weight ratios substantially as described in the William E. Hanford, U.S. Patent No. 2,396,785 for preparation of ethylene copolymers. However, they are more conveniently made by first preparing a copolymer of ethylene and a lower alkyl acrylate, e.g., as described in said Hanford patent and in the Heinrich Hopf et al. U.S. Patent No. 2,334,195, and then hydrolyzing the ester groups to the free carboxy groups, as also disclosed in said Hanford patent or in the Michael W. Perrin et al. U.S. Patent No. 2,200,429, e.g., by heating the ethylene/alkyl acrylate copolymer in water with acid or preferably alkali until substantially all of the ester groups have been converted to carboxy groups.

The ethylene/carboxylic acid copolymer thus obtained consists essentially of the repeating unit derived from the ethylene, i.e., —CH$_2$CH$_2$— and the repeating unit derived from the acrylic component, i.e.,

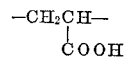

The combination of the aliphatic hydrocarbon backbone of the copolymer and the vertically disposed carboxy groups imparts simultaneous hydrophobic and adhering characteristics to the copolymer. The crystallinity present in ethylene/acrylic acid copolymers containing a major portion by weight of ethylene units also contributes to further lower the moisture permeability of the product.

In the present process, the adhesive copolymer must consist at least 50 percent by weight of ethylenic groups with the balance being derived from acrylic acid, i.e., not more than 33⅓% of the monomer units in the polymer may be the acid units and at least 66⅔% of the monomer units in the polymer must be the —CH$_2$CH$_2$— units which are derived from ethylene. The high ethylenic content contributes to the good moisture-resistivity of the adhesive. Intermolecular forces between the carboxy radicals and the substrate surface account for the adhesive properties of the copolymer. Although the nature of said forces is unknown, it is believed that the mechanism is one of chemisorption; i.e., there is a specific interaction leading to the formation of a bond of definite type between the —COOH groups and ions present at the substrate surface. When the adhesive is an ethylene/acrylic acid copolymer, only a few such bonds are needed to assure adhesion, i.e., copolymers wherein 5% by weight of the above-depicted acid units are present, possess adhesive properties. As the number of carboxy groups increases, the adhesion increases. However, increase of the acid groups is always at the expense of the ethylenic group. When less than 50% by weight (66⅔% of the monomer units of the copolymers) are ethylenic the polymer no longer possesses the crystallinity which it must possess to serve as an adhesive in the present purpose. A preferred lower limit of ethylenic content is about 70% by weight (about 83% of the units of the copolymer). This gives improved moisture-resistance and high adhesivity. However, when moisture-resistivity is the main objective, an even higher ethylenic content is desirable. Excellent results are obtained with respect to both properties by using copolymers wherein the weight percent content of ethylenic units is from, say, 81% to 90% (from 92 to 96 —$CH_2CH_2$— units). Although the number of acidic units in the high weight ratio ethylene copolymer is low, i.e., when the copolymer consists of 90% by weight of ethylenic units so that it contains 96% by number of the (—$CH_2CH_2$—) units in the chain and 4% of the —$CH_2CH(COOH)$— units, strong adhesivity is still demonstrated.

While numerous rubbery acrylate polymers are useful as pressure-sensitive adhesives owing to their inherent tackiness, such polymers generally possess poor resitivity to moisture because of absence of crystallinity in such copolymers, and the easy hydrolysis of the ester groups. Moreover, their adhesivity is usually inadequate for bonding to metals and other non-fibrous surfaces.

It is known that peroxidic, free radical-liberating compounds may be reacted with some preformed olefin copolymers and cured to form crosslinked adhesive bonds having good moisture-resistivity. However, during curing the presence of the free radical-liberating agent causes formation of pockets of oxygen or air in the adhesive layer. Thereby not only is bond-strength lowered; but also, when the substrate is an oxidizable metal, there eventually occurs reaction between the occluded oxygen and the metal to form an easily ruptured oxide at the metal/adhesive interface. Surprisingly, use of an ethylene copolymer having free carboxy radicals, as in the present process, eliminates the necessity of curing in the presence of a peroxidic compound in order to obtain either moisture-resistance or good adherence. However, where resistance to ultrahigh temperature is required, the ethylene/acrylic copolymers can also be crosslinked without encountering the problems described by use of finely divided bivalent metals or metal oxides, for example, magnesium or magnesium oxide.

According to the invention, the crystalline ethylene/acrylic acid copolymers, either in film or comminuted form are placed between the surfaces to be bonded and the resulting assembly is heated to at least the melting point of the copolymer. Contact of the molten copolymer with the substrate results in adsorption of the copolymer on the substrate surfaces, probably by the formation of chemical bonds between the carboxy radicals of the copolymer and, e.g., the metal or metal oxide ions of a metal, the hydroxy ions of a cellulosic substance and possibly of glass, etc. Hydrogen bonding may explain adhesiveness of the molten polymer to still other substrates. Prolonged contact of the molten copolymer with the substrate is generally not required for satisfactory adhesion to occur. Upon cooling, the copolymer resumes its crystalline state but it remains tenaciously fixed to the substrate.

The presently provided bonding process is conducted without application of any great amount of pressure. Generally the pressure which is required is only that necessary to maintain proper positioning of the substrate surface. Advantageously, the bonding is conducted by placing one of the substrates in a press, applying a layer of the copolymer on the top surface of the substrate, placing the other substrate on the layer of copolymer and applying a pressure of, say, from 20 to 500 p.s.i., to the resulting assembly while heating it to the melting point of the copolymer. When large surfaces are being joined together, heating may be continued to, say, some 40 or 50° C. above the melting point of the copolymer; generally, however, heating at substantially above the melting point of the copolymer is unnecessary. Also, long periods of heating after the melting point of the copolymer has been attained are not needed; however, in order to assure that uniform melting of the copolymer has occurred, the assembly may be held at the melting temperature for a few minutes before the temperature is decreased. Pressure is maintained as the assembly cools; in some cases, particularly when a coolant is used, it may be advantageous to increase the pressure somewhat at the very inception of cooling. The process may also be conducted by first melting the copolymer and applying the molten material to the substrate.

The present process is useful for bonding surfaces generally; but because it provides a tenacious bond between two smooth surfaces, it is particularly useful in joining together articles of metal, glass or plastics. Thus the invention provides a means of bonding metal to metal, plastic to metal, glass to plastic, or glass to glass as in the manufacture of safety glass. The present process is especially useful in bonding to readily oxidizable metals in that the adhesive layer contains no bubbles of entrapped air which could attack the metal surface and/or facilitate migration of moisture to the metal. Hence it serves admirably for bonding not only metal to metal but also for the manufacture of reinforced plastics, leather and textiles of all kinds wherein such materials are bonded to a firm, metal backing. For example, the invention provides a means for adhering plastic sheeting of, e.g., a polyolefin or a polyimide, to metals such as aluminum or iron. It provides a means of sound-proofing by adhering viscoelastic materials, e.g., the rubbery copolymers of polyvinyl chloride or butadiene, to structural metal panels. It provides a facile means of thermally insulating and/or protecting against impact by bonding a layer of foamed plastic to metal base. Since the temperature for conducting the present process is quite low and the pressure required is minimal, the invention also provides a means of adhering plastic foams to cellulosic or wool textiles as, for example, in the preparation of insulated, laminated cloth. Because no peroxidic agent is employed in the process, there is no danger of injuring delicate fabrics during the bonding.

The invention also provides a means of bonding glass to glass as for example, in the manufacture of safety glass and in the fabrication of stained glass windows and ornamental objects, generally. Accordingly, the invention is useful in the preparation of laminated products, generally.

The present process is also exceptionally well-suited to the production of composites wherein fibrous materials which may be of cellulose, glass or metal are imbedded in a continuous phase of the ethylene/acrylic acid copolymer. Thus, in a specific embodiment of the invention, a composite is formed by stacking sheets of the textile or screen with alternating layers of the ethylene/acrylic acid copolymer in either powder or film form and subjecting the resulting assembly to heat and pressure in order to melt the polymer and to assure flow of the polymer throughout the assembly to form a continuous phase of the polymer. Composites may be similarly formed by working with glass rovings or pieces of metal fiber.

Another embodiment of the invention comprises the use of highly comminuted heavy metals, e.g., powdered aluminum or magnesium, as fillers for the ethylene/acrylic acid copolymer bonding medium. Since the copolymer appears to possess a particular affinity for metal, inclusion of, e.g., particulated copper into the adhesive when bonding electrical conductors results not only in an electrically conductive bonding but also increases cohesive strength. The highly comminuted metal is advantageously employed in quantities of about from 5% to 50% based on the weight of the copolymer.

Still another extremely important aspect of the invention is the inclusion of a small amount, say from 1.0 to 15% by weight of the copolymer, of an alkaline earth metal oxide into the bonding medium. The oxide serves to toughen the bond not only through some internal crosslinking of the carboxy radicals, but it also forms bridges between the substrate and the copolymer to give a bubblefree bond of improved tenacity. Useful oxides for this purpose are e.g., ferric oxide, manganous oxide, tin oxide, barium oxide and magnesium oxide. The later is preferred, particularly when the substrate is glass or a heavy metal. The metal oxide crosslinking agent may or may not be used together with a finely comminuted metal as filler, e.g., the ethylene/acrylic acid copolymer may contain from 10% to 50% of powdered heavy metal as filler and from 1 to 15% of alkaline earth metal oxide as the crosslinking agent.

The invention is further illustrated by, but not limited to, the following examples:

EXAMPLE 1

Aluminum 3.5" x 1.0" x 0.063" panels were cleaned at the contemplated bonding areas (0.5" overlap along the 1.0" dimension) by means of a power buffing machine. They were then immersed in boiling toluene for 20 minutes, rinsed in acetone, and air-dried. A film of completely hydrolyzed 86:14 weight ratio ethylene/methyl acrylate copolymer was placed between two pieces of the aluminum at the lap joints, allowing a 0.5" overlap on the bonding surface. The lap joints were heated in a 30 ton compression press to 140° C. at 200 p.s.i. for 5 minutes, the pressure was increased to 300 p.s.i. as the aluminum cooled to 110° C., and water-cooling was used to cool to room temperature over a 10-minute period. Several test specimens were thus prepared. They were stored under the conditions shown below and found to have the following properties:

| Bonding area, sq. in. | Days of storage at— | | Tensile shear strength, p.s.i. | Elongation at break, percent |
|---|---|---|---|---|
| | 72° F., 40% RH | 140° F., 80% RH | | |
| 0.563 | 10 | | 995 | 6.2 |
| 0.531 | 10 | | 923 | 5.5 |
| 0.500 | 10 | | 920 | 4.6 |
| 0.500 | | 28 | 850 | 5.4 |

The Tensile Shearing Strength test was conducted substantially as described in American Society for Testing Materials Designation D–1002–53T, ASTM Standards, 1961, part 6, p. 519. The percent elongation was determined by measuring the amount of sample extension and dividing this distance by length of the test section. It will be noted from the above data that the shear strength increases with the bonding area, and that very little effect is noted upon storing at 0.5 in.² specimen in the very hot, humid atmosphere.

For purposes of comparison, the same ethylene/acrylic acid copolymer was mixed with 3 percent by weight of the copolymer of dicumyl peroxide and sheeted to film. The film was then used for bonding aluminum as described above for the peroxide-free ethylene/acrylic acid copolymer, except that heating was conducted at 150° C. for 1 hour instead of at 140° C. for 5 minutes and that the lap joints were water-cooled to room temperature over a 15 minute period. The test specimens thus obtained had a considerable number of air pockets. One of the specimens, having a bonding area of 0.500 in.², was stored for 3 days at 72° F. and 50% relative humidity (RH). At the end of that time it was found to have a tensile shear strength of 600 p.s.i. Other specimens were stored at 140° F. and 80% RH for 14 days. The following results were observed at the end of this time:

| Bonding area, sq. in.: | Tensile shear strength, p.s.i. |
|---|---|
| 0.563 | 497 |
| 0.500 | 480 |
| 0.469 | 448 |

In all of the specimens which had been tested the failure resulted from breaking the bond between the adhesive and the aluminum. Inspection of the exposed adhesive showed that from 40 to 50% of the surface area of the adhesive layer was pitted, indicating bubble-formation. Accordingly, the use of a peroxidic crosslinking agent for effective cure of the ethylene/acrylic acid copolymer is disadvantageous.

EXAMPLE 2

This example is like Example 1, except that the copolymer was mixed on the rolling mill with 5% of finely powdered magnesium oxide by weight of the copolymer and sheeted to a 5 mil thickness. The sheeting was then used for bonding aluminum as described in Example 1 for the hydrolyzed ethylene/methyl acrylate copolymer, alone. Testing of the resulting specimen after storage for 28 days at 140° F. and 80% relative humidity gave a tensile shear strength of 1240 p.s.i. and a 9.8% elongation at break.

EXAMPLE 3

This example is like Example 1, except that stainless steel, instead of aluminum, was used with the ethylene/acrylic acid copolymer, alone. The following test data were obtained on various specimens thus prepared:

| Glue line, mils | Days of storage at— | | Tensile shear strength, p.s.i. | Elongation at break, percent |
|---|---|---|---|---|
| | 72° F., 40% RH | 140° F., 80% RH | | |
| 2.0 | 10 | | 1,240 | 8.2 |
| 2.0 | 10 | | 1,130 | 7.0 |
| 1.5 | 10 | | 791 | 2.1 |
| 3.0 | 10 | | 1,320 | 6.0 |
| 2.5 | 10 | | 1,000 | 8.0 |
| 2.0 | | 18 | 800 | 3.6 |
| 2.0 | | 18 | 704 | 4.3 |
| 2.0 | | 28 | 724 | 7.6 |

EXAMPLE 4

This example is like Example 1, except that low carbon, cold roll steel was used instead of aluminum with the hydrolyzed ethylene/methyl acrylate copolymer, alone. A test specimen having a glue line of 3 mils was stored for 10 days at 72° F. and 40% relative humidity and found to have a tensile strength of 1120 p.s.i. and 5.4% elongation at break. Another specimen, having a glue line of 2.5 mils was stored for 28 days at 140° F. and 80% relative humidity and then found to have tensile shear strength of 940 p.s.i. and 7.8% elongation at break.

EXAMPLE 5

An 80:20 weight ratio, crystalline ethylene/acrylic acid copolymer in granulated form is applied in a 5 mil thick layer to the surface of a 5" x 2" x 0.125" aluminum bar, and a 5" x 2" x 0.02" piece of polypropylene is placed on the layer of copolymer to give a 2.5" lap joint and a total assembly length of 7.5". The assembly is heated in the press to 140° C. at a pressure of 20–30 p.s.i., maintained at this temperature for 5 minutes, and then allowed to cool to room temperature. When the resulting bonded piece is tested for adhesiveness by pulling the free length of polypropylene the latter breaks while the bond remains intact. Other plastic material may be similarly cemented to metal, so long as the softening point of the plastic is substantially above the melting point of the crystalline ethylene/acrylic acid copolymer.

EXAMPLE 6

A 4.5" x 1.0" x 0.25" panel of plywood was placed on a polished press plate, and a 1.0" x 0.5" x 0.02" strip of an ethylene/acrylic acid copolymer, wherein there were present about seven —CH₂CH(COOH) units per ninety-three —CH₂CH₂— units, was placed lengthwise on the top surface of the plywood along the 1.0" dimension of the panel. A second piece of plywood, having the same dimension as the first, was positioned on the copolymer strip to form a simple lap joint of 0.5" overlap. The resulting assembly was then cured by heating in the press at 150° C. for 5 minutes at 50 p.s.i. The well-bonded unit thus obtained, having a bonding area of 0.438 in.², was found to have a tensile shear strength of 436 p.s.i. and an elongation of 6.2% at break.

EXAMPLE 7

The procedure described in Example 6 was repeated except that instead of using the plywood of Example 6 there were employed two 3" x 1" x 0.04" pieces of glass. There was thus obtained a well-bonded unit having a tensile shear strength of 356 p.s.i. and an elongation of 6.4% at break.

When glass fiber textile was used instead of the glass and the pieces of textile were stacked without an overlay, a well-bonded composite of high impact strength was obtained.

EXAMPLE 8

An ethylene/acrylic acid copolymer, consisting of 93 percent of —CH₂CH₂— units and 7% of the

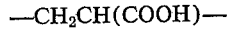
—CH₂CH(COOH)— units, was pressed into a 40 mil thick sheet and cut into very fine strips.

Four well-bonded specimens were prepared as follows: 0.1" x 0.5" x 1.125" pieces of uranium were pickled in 1:1 aqueous nitric acid, rinsed briefly with distilled water and then with acetone, and finally air-dried. Nine of the fine strips were placed between an 0.5" overlap of the two uranium pieces to give a 1.0" long assembly. The assembly was heated between press plates at ca. 200 p.s.i. to 140° C. within 5 minutes, and the pressure was then increased to 300 p.s.i. as the temperature was decreased to 110° C. The assembly was then allowed to cool to room temperature to obtain the test specimens.

Two of the specimens were tested the same day. They were found to have tensile shear strengths of 1223 and 1322 p.s.i. and percent elongations at break of 7.3% and 8.1%, respectively. Another two specimens were stored for five days at 80% relative humidity and 140° F. At the end of this time, they were found to have a tensile shear strength of 1278 and 1302 p.s.i. and a percent elongation at break of 7.5% and 6.0%.

EXAMPLE 9

An ethylene/acrylic acid copolymer consisting of 93 percent of —CH₂CH₂— and 7% of the

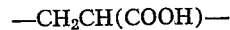
—CH₂CH(COOH)— units was compounded on the mill roll with 50 parts by weight of finely divided, 6µ average particle size, aluminum powder, and pressed into a 10 mil thick sheet. One-half inch wide strips were then cut from the sheets. Four well-bonded specimens of uranium sheets were prepared as follows: 0.1" x 0.5" x 1.125" pieces of uranium were pickled in 1:1 aqueous nitric acid, rinsed briefly with distilled water and then with acetone, and finally air dried.

A strip of the above aluminum powder filled ethylene/acrylic acid copolymer film was then placed between a 0.5" overlap of the two cleaned uranium pieces to give a 1" long assembly. The assembly was heated between press plates at ca. 200 p.s.i. to 140° C. within 5 minutes, and the pressure was then increased to 300 p.s.i. as the temperature was decreased to 110° C. The assembly was then allowed to cool to room temperature to obtain the test specimen. Two of the test specimens were tested the same day. They were found to have tensile shear strengths of 1567 and 1618 p.s.i., and percent elongations to break of 6.3% and 5.8% respectively. Another two specimens were stored for 5 days at 80% relative humidity and 140° F. At the end of this time, they were found to have tensile shear strengths of 1590 and 1630 p.s.i. and percent elongations at break of 6.2% and 5.7%.

Use of thorium, instead of uranium as the substrate, likewise gives very good results. When working in such highly oxidizable metals as uranium, the bonding may be conducted in an inert atmosphere.

Owing to the fact that it is believed that the molten condition of the ethylene/acrylic acid copolymers facilitates adhesion to the substrate, the copolymers are preferably used in the solid form, rather than in solution.

Although materials which liberate oxygen or other gases during the bonding process are not recommended for use with the copolymers owing to the production of weakening, discontinuous phases in the polymer bond, there may or may not be used various fillers, and pigments and other additives which do not promote the liberation of such bubble-inducing materials.

It is to be understood that although the invention has been described with specific reference to particular embodiments thereof, it is not to be so limited since obvious changes and alterations therein may be made which are within the full intended scope of this invention as defined by the appended claims.

What is claimed is:
1. The method of adhesively bonding by means of an ethylene/acrylic acid copolymer consisting essentially of from 50 to 95 weight percent ethylene with the balance being acrylic acid, which comprises pressing the molten copolymer between wooden bodies to contact the molten copolymer with those surface areas of said bodies which are to be bonded, and then maintaining said contact while allowing the copolymer to harden by cooling to ambient temperature.

2. The method of adhesively bonding by means of an ethylene/acrylic acid copolymer consisting essentially of from 50 to 95 weight percent ethylene with the balance being acrylic acid, which comprises pressing the molten copolymer between uranium bodies to contact the molten copolymer with those surface areas of said bodies which are to be bonded, and then maintaining said contact while allowing the copolymer to harden by cooling to ambient temperature.

3. The method of adhesively bonding by means of an ethylene/acrylic acid copolymer consisting essentially of from 50 to 95 weight percent ethylene with the balance being acrylic acid, said copolymer being mixed with finely comminuted alkaline earth metal oxide in a quantity equal to from 1.0 to 15% by weight of the copolymer, which comprises pressing the molten copolymer between bodies having a melting point above the melting point of the copolymer to contact the molten copolymer with those surface areas of said bodies which are to be bonded, and then maintaining said contact while allowing the copolymer to harden by cooling to ambient temperature.

4. The method of adhesively bonding by means of an ethylene/acrylic acid copolymer consisting essentially of from 50 to 95 weight percent ethylene with the balance being acrylic acid, said copolymer being mixed with finely comminuted aluminum powder in a quantity equal to from 5 to 50% by weight of the copolymer, which comprises pressing the molten copolymer between bodies having a melting point above the melting point of the copolymer to contact the molten copolymer with those surface areas of said bodies which are to be bonded, and then maintaining said contact while allowing the copolymer to harden by cooling to ambient temperature.

5. The method defined in claim 4, further limited in that the copolymer is pressed between steel bodies.

6. The method defined in claim 4, further limited in that the copolymer is pressed between uranium bodies.

7. The method defined in claim 4, further limited in that the copolymer is pressed between wooden bodies.

8. The method defined in claim 4, further limited in that the copolymer is mixed with from 1.0 to 10% by weight of finely comminuted alkaline earth metal.

9. The method defined in claim 4, further limited in that the copolymer is mixed with from 1.0 to 10% by weight of finely comminuted magnesium oxide.

10. The method of adhesively bonding by means of an ethylene/acrylic acid copolymer consisting essentially of from 50 to 95 weight percent ethylene with the balance being acrylic acid, said polymer being mixed with (a) finely comminuted alkaline earth metal oxide in a quantity equal to from 1 to 15% by weight of the copolymer, and (b) finely divided heavy metal in a quantity equal to from 5 to 50% by weight of the copolymer, which comprises pressing the molten copolymer between bodies having a melting point above the melting point of the copolymer to contact the molten copolymer with those surface areas of said bodies which are to be bonded, and then maintaining said contact while allowing the copolymer to harden by cooling to ambient temperature.

References Cited

UNITED STATES PATENTS

| | | | |
|---|---|---|---|
| 2,838,437 | 6/1958 | Busse et al. | 154—139 |
| 3,132,120 | 5/1964 | Graham et al. | 260—78.5 |
| 3,143,364 | 8/1964 | Klein | 285—55 |
| 3,249,570 | 5/1966 | Potts et al. | 260—29.6 |
| 3,344,014 | 9/1967 | Rees | 161—203 |

EARL M. BERGERT, *Primary Examiner.*

D. J. FRITSCH, *Assistant Examiner.*

U.S. Cl. X.R.

156—334